US011096498B1

(12) United States Patent
Chalfin et al.

(10) Patent No.: US 11,096,498 B1
(45) Date of Patent: Aug. 24, 2021

(54) CHAIR WITH INTEGRATED HANGER

(71) Applicant: SAMUELSON GROUP INC., Paterson, NJ (US)

(72) Inventors: Michael Adam Chalfin, Wayne, NJ (US); Michael Angelo Rinaldi, Bloomingdale, NJ (US); Lawrence Mark Chalfin, Wayne, NJ (US)

(73) Assignee: SAMUELSON GROUP INC., Paterson, NJ (US)

( * ) Notice: Subject to any disclaimer, the term of this patent is extended or adjusted under 35 U.S.C. 154(b) by 0 days.

(21) Appl. No.: 17/226,365

(22) Filed: Apr. 9, 2021

Related U.S. Application Data

(60) Provisional application No. 63/133,817, filed on Jan. 5, 2021.

(51) Int. Cl.
*B60R 7/10* (2006.01)
*A47C 7/62* (2006.01)
*A47G 29/00* (2006.01)

(52) U.S. Cl.
CPC ............ *A47C 7/62* (2013.01); *A47G 29/00* (2013.01); *B60R 7/10* (2013.01)

(58) Field of Classification Search
CPC .. A47C 7/64; B60N 3/101; B60R 7/10; B60R 2011/0015
See application file for complete search history.

(56) References Cited

U.S. PATENT DOCUMENTS

| | | | | |
|---|---|---|---|---|
| 5,058,790 A | * | 10/1991 | LaVelle | A47C 7/64 224/275 |
| 6,340,104 B1 | * | 1/2002 | Saylor | A47G 25/06 223/85 |
| 6,457,690 B1 | * | 10/2002 | Spykerman | B60R 7/10 224/313 |
| 2008/0169667 A1 | * | 7/2008 | Siniarski | B60R 11/00 296/37.8 |
| 2011/0057431 A1 | * | 3/2011 | Yamazaki | B62J 7/02 280/769 |
| 2017/0065113 A1 | * | 3/2017 | Boles | A47G 25/1442 |
| 2017/0120840 A1 | * | 5/2017 | Harris | B60R 11/02 |
| 2020/0146470 A1 | * | 5/2020 | Quezada | B60R 7/10 |
| 2020/0331401 A1 | * | 10/2020 | Yilma | B60R 7/10 |

FOREIGN PATENT DOCUMENTS

| | | | | |
|---|---|---|---|---|
| CN | 204870781 U | * | 12/2015 | ............ B60R 7/10 |
| DE | 1164256 B | * | 2/1964 | ............ B60R 7/10 |
| DE | 102005042914 A1 | * | 4/2007 | ............ B60R 7/043 |

(Continued)

*Primary Examiner* — Timothy J Brindley
(74) *Attorney, Agent, or Firm* — Riverside Law LLP

(57) ABSTRACT

A chair includes a seating portion connected to a back portion and a hanger connected to the back portion. The hanger includes a front plate, a back plate opposing the front plate, and a plate separator defining a lower and an upper gap between the front plate and the back plate. An interior surface of the front plate that at least partially defines the lower gap includes a first concave radius of curvature opening away from the back plate and a sidewall portion angled towards the back plate. An interior surface of the plate separator that at least partially defines the lower gap includes a second concave radius of curvature opening away from the back plate and a sidewall portion angled towards the back plate.

12 Claims, 10 Drawing Sheets

(56) References Cited

FOREIGN PATENT DOCUMENTS

| | | | | |
|---|---|---|---|---|
| DE | 102013007897 A1 | * | 3/2014 | ............... B60R 7/10 |
| DE | 202016006734 U1 | * | 1/2018 | ............... B60R 7/10 |
| DE | 202018100379 U1 | * | 2/2018 | ............. B60Q 3/233 |
| FR | 3014510 A1 | * | 6/2015 | ............... B60R 7/10 |
| JP | 2004125044 A | * | 4/2004 | ............... B60R 7/10 |
| JP | 2010111139 A | * | 5/2010 | ............... B60R 7/10 |
| KR | 20160061674 A | * | 6/2016 | |
| KR | 20180116730 A | * | 10/2018 | |
| WO | WO-2011054489 A1 | * | 5/2011 | ............. B60R 7/043 |

* cited by examiner

CHAIR WITH INTEGRATED HANGER

CROSS-REFERENCE TO RELATED APPLICATIONS

This application claims priority to U.S. provisional application No. 63/133,817 filed on Jan. 5, 2021 incorporated herein by reference in its entirety.

BACKGROUND OF THE INVENTION

Walkers are mobility assistance devices commonly used by seniors, people with disabilities, those recovering from injury and others who may otherwise have arthritis, leg or hip weakness, balance problems and other types of mobility issues. Most walkers have a feature that allow it to fold or collapse when not in use to save space. For example, 3-sided rigid frame walkers typically allow the side panels to fold against the front panel, while other walkers may allow a collapsing fold that scrunches the walker into a small footprint.

Under many circumstances, the storage of walkers can become a safety issue. For example, at senior living facilities, where large numbers of the population rely on walkers, storage of walkers becomes an issue in common areas such as dining rooms. In some facilities, walkers are stored in a common area just off the main entrance. This leads crowded walker storage areas, making it difficult to retrieve the walker when leaving. This also requires the user to walk unassisted to their table, or otherwise requires extra resources such as additional staff to assist the person to and from their table. In other facilities, walkers are stored in the dining area at or adjacent to the table. This gets the user closer to their chair with the walker and without staff assistance but causes crowding of walkers where dining takes place, causing an unsafe work environment for food service workers by obstructing their walking and serving lanes.

Thus, what is needed in the art is an improved device for storing walkers when not in use that allows users to keep their walker accessible, closer to their ultimate seating destination, while minimizing the walker as an obstruction for people that need to safely navigate the area where the walker is being stored.

SUMMARY OF THE INVENTION

In one embodiment, a chair includes a seating portion connected to a back portion, and a hanger connected to the back portion, the hanger comprising a front plate, a back plate opposing the front plate, and a plate separator defining a lower and an upper gap between the front plate and the back plate, wherein an interior surface of the front plate that at least partially defines the lower gap comprises a first concave radius of curvature opening away from the back plate and a sidewall portion angled towards the back plate, and wherein an interior surface of the plate separator that at least partially defines the lower gap comprises a second concave radius of curvature opening away from the back plate and a sidewall portion angled towards the back plate. In one embodiment, a gap between the first and second concave radius of curvature increases moving away from center. In one embodiment, the upper gap is larger than the lower gap. In one embodiment, the back plate is tapered inward. In one embodiment, the back plate comprises first and second connection elements, and a vertex of the first and second concave radius of curvature is positioned halfway between first and second connection elements. In one embodiment, the first and second connection elements are first and second fastener openings. In one embodiment, the back portion is angled at least partially backwards.

In one embodiment, a chair hanger includes a front plate, a back plate opposing the front plate, and a plate separator defining a lower and an upper gap between the front plate and the back plate, wherein an interior surface of the front plate that at least partially defines the lower gap comprises a first concave radius of curvature opening away from the back plate and a sidewall portion angled towards the back plate, and wherein an interior surface of the plate separator that at least partially defines the lower gap comprises has a second concave radius of curvature opening away from the back plate and a sidewall portion angled towards the back plate. In one embodiment, a gap between the first and second concave radius of curvature increases moving away from center. In one embodiment, the upper gap is larger than the lower gap. In one embodiment, the back plate is tapered inward. In one embodiment, the back plate comprises first and second connection elements, and a vertex of the first and second concave radius of curvature is positioned halfway between first and second connection elements.

BRIEF DESCRIPTION OF THE DRAWINGS

The foregoing purposes and features, as well as other purposes and features, will become apparent with reference to the description and accompanying figures below, which are included to provide an understanding of the invention and constitute a part of the specification, in which like numerals represent like elements, and in which.

DETAILED DESCRIPTION OF THE INVENTION

Figure 1A:
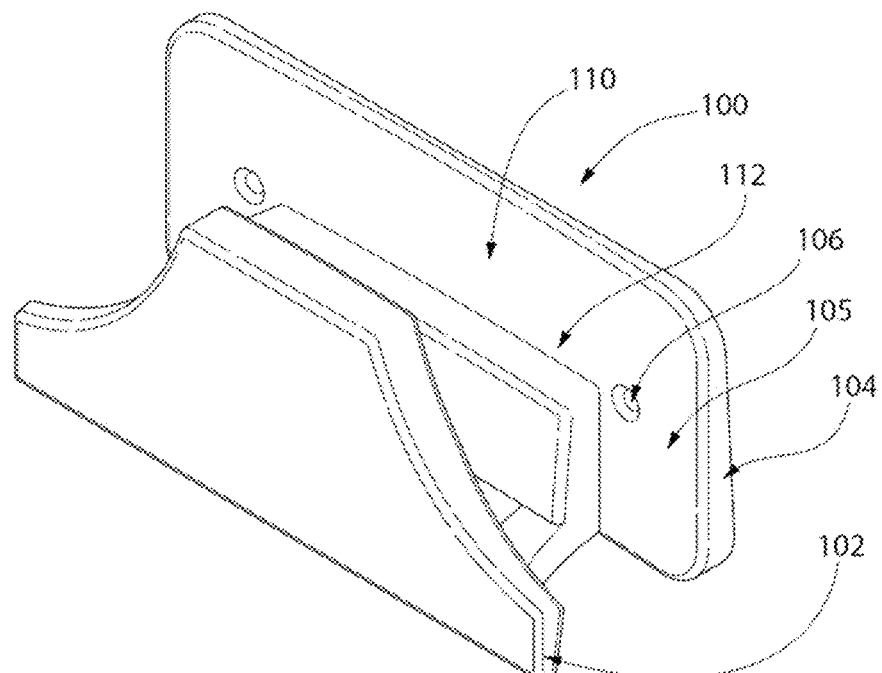
FIG. 1A is a perspective view of a hanger according to one embodiment.

It is to be understood that the figures and descriptions of the present invention have been simplified to illustrate elements that are relevant for a more clear comprehension of the present invention, while eliminating, for the purpose of clarity, many other elements found in chairs having integrated hangers. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, and ±0.1% from the specified value, as such variations are appropriate.

Ranges: throughout this disclosure, various aspects of the invention can be presented in a range format. It should be understood that the description in range format is merely for convenience and brevity and should not be construed as an inflexible limitation on the scope of the invention. Where appropriate, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Referring now in detail to the drawings, in which like reference numerals indicate like parts or elements throughout the several views, in various embodiments, presented herein is a chair with integrated hanger.

Figure 1B:
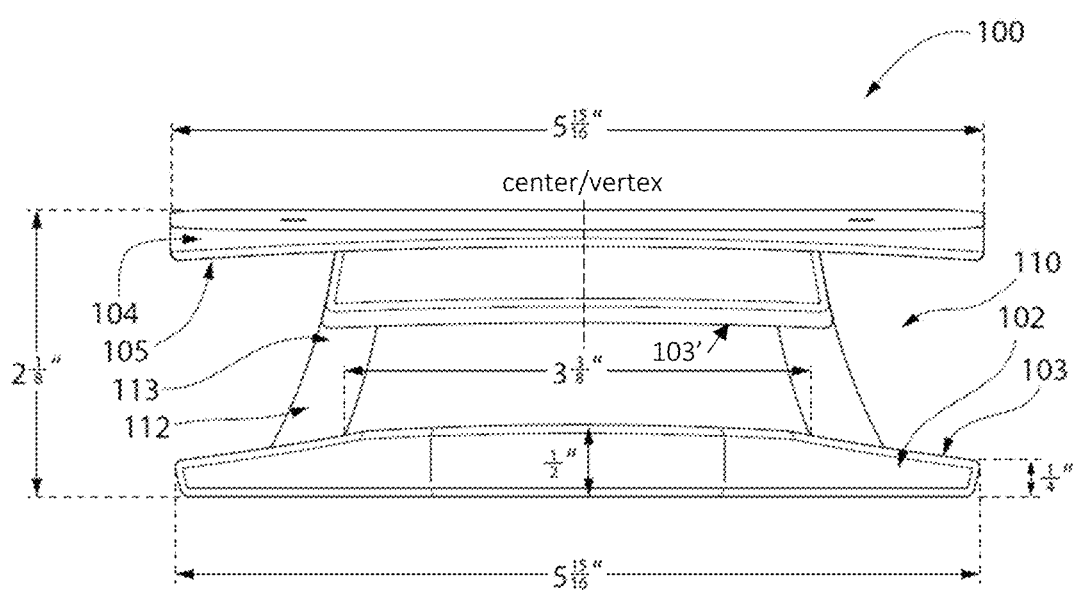
FIG. 1B is a top view.
Figure 1C:
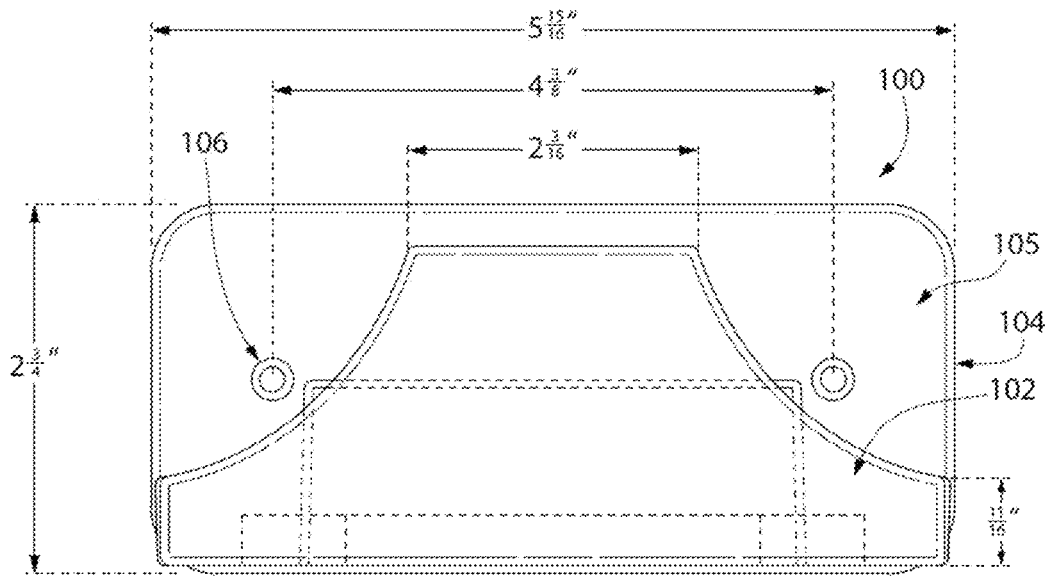
FIG. 1C is a front view and FIG. 1D is a side view of the embodiment of FIG. 1A.
Figure 1D:
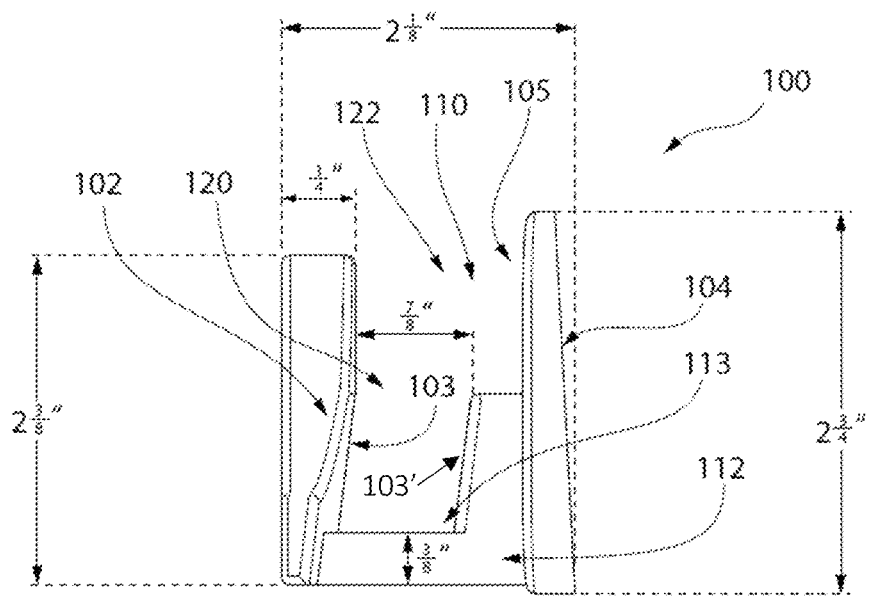

With reference now to FIGS. 1A-1D, a hanger 100 is shown according to one embodiment. The hanger 100 includes a front plate 102, a back plate 104 opposite the front plate 102 and configured for positioning against the back of a chair, and a gap 110 separating the front plate 102 and the back plate 104. The back plate 104 can include one or more openings 106 provided for fastening the hanger 100 to the back of a chair. With reference specifically to FIG. 1B, the geometry of the gap 110 is provided by an interior surface 103 of the front plate 102, a front surface 105 of the back plate 104, and a top surface 113 of a plate separator 112. With reference specifically to FIG. 1D, aspects of the hanger 100 geometry are shown which provide several advantages over conventional hanger designs. First, its noted that chairs conventionally have a back portion that's pitched or leans back slightly for the comfort of the user (see e.g. FIG. 2B and experimental examples, FIGS. 6A-6D). As shown in FIG. 1D, the back plate 104 tapers inward moving from the bottom to the top (a wider profile on bottom gradually tapering to a narrower profile at the top) to compensate for chair pitch. The proper walker hanging angle and secure fit is further provided by the front plate 102 interior surface 103 sidewall and adjacent plate separator 113 interior surface 103' sidewall which are both angled towards the back plate 104, providing a bottom gap opening 120 for wedging the hanger into a stationary and sway-resistant position. The wedge is provided in part by a curved interior surface 103 and 103' sidewalls having a curvature opening away from the back plate 104 and widening their separation (and the gap 110) as the curves move away from center. This provides a tighter wedge-type fit at center, balancing and stabilizing the walker on-center all while making walkers easy to load and retrieve by hand on either side of the hanger. Further, the top surface 113 of the plate separator 112 further provides a 2-step slot for the two conventional categories of walker bar profile sizes and geometries (circular and square), via the smaller gap 120 at the bottom for holding a conventional walker bar profile and the larger gap 122 at the top for holding non-conventional sizes, providing a single hanger 100 that can securely hold multiple sized walkers or some other second object atop a walker mounted below. Embodiments advantageously provide a proper angle for walkers to set in the hanger, tucked into the pitch of the chair back while maintaining a separation from the chair to avoid hitting or damaging the chair. This design also minimizes walker sway while mounted in the hanger, stabilizing the hanger while also making it easy for users to mount and retrieve. Dimensions shows are for illustrative purposes only according to one embodiment, and those having ordinary skill in the art will recognize that other dimension are possible without deviating from advantages of the embodiments described herein. Those having ordinary skill in the art will also recognize that advantages of the embodiments can be captured in a 2-piece hardware set. For example, the 2-step slot geometry shown in FIGS. 1A-1D can be provided by separate pieces of hardware, one having a single smaller gap (the lower gap) for holding a conventional walker bar profile and a second having a single larger gap (the upper gap) for holding non-conventional sizes and/or other objects. Accordingly, a 2-piece hardware set can be secured to a chair for holding multiple sized walkers (or a walker and some other second object) without deviating from advantages of the embodiments described herein. Those having ordinary skill in the art will also recognize that advantages of the embodiments can be captured in a 2-piece hardware set. For example, the 2-step slot geometry shown in FIGS. 1A-1D can be provided by separate pieces of hardware, one having a single smaller gap (the lower gap) for holding a conventional walker bar profile and a second having a single larger gap (the upper gap) for holding non-conventional sizes and/or other objects. Accordingly, a 2-piece hardware set can be secured to a chair for holding multiple sized walkers (or a walker and some other second object) without deviating from advantages of the embodiments described herein.

Figure 2A:
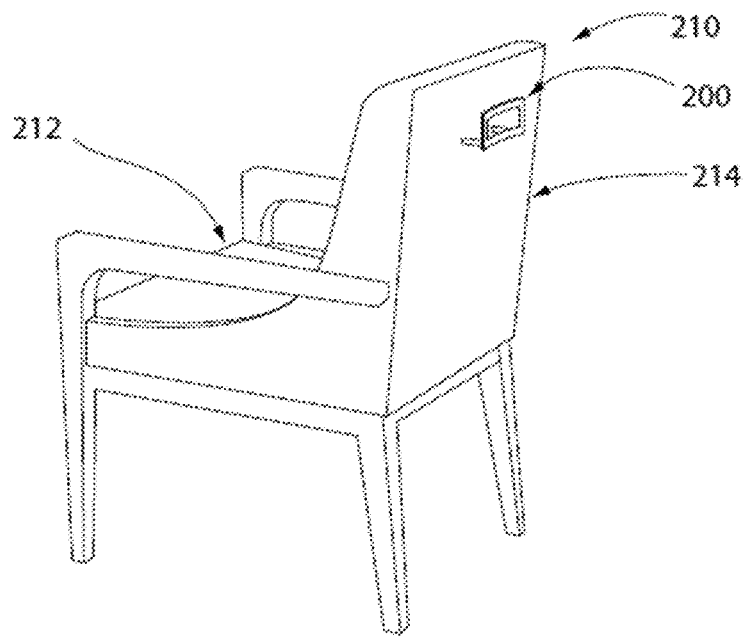
FIG. 2A is a perspective view of a chair with integrated hanger and FIG. 2B is an alternate perspective view according to one embodiment.
Figure 2B:
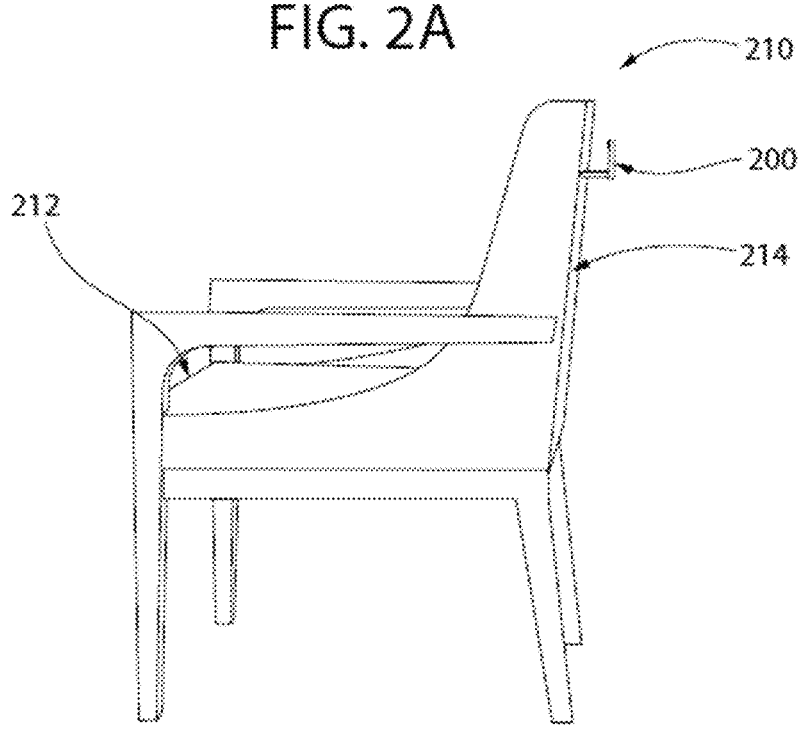
Figure 3A:
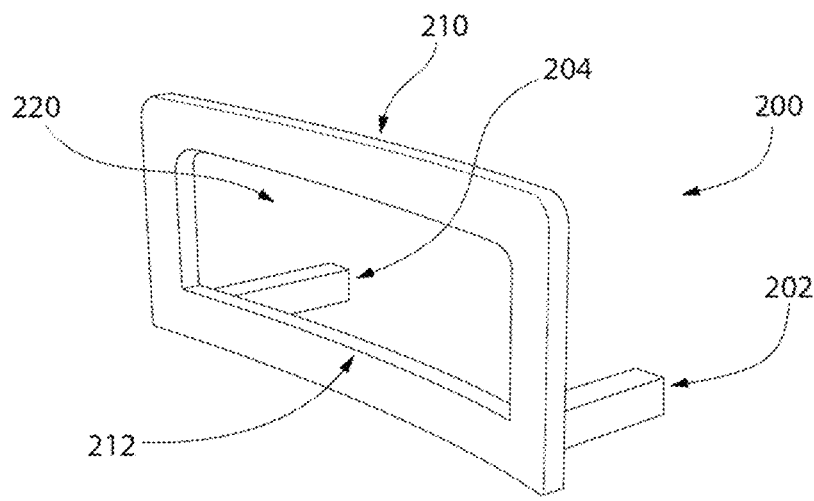
FIG. 3A is a perspective view of a hanger and FIG. 3B is an alternate perspective view according to one embodiment.
Figure 3B:
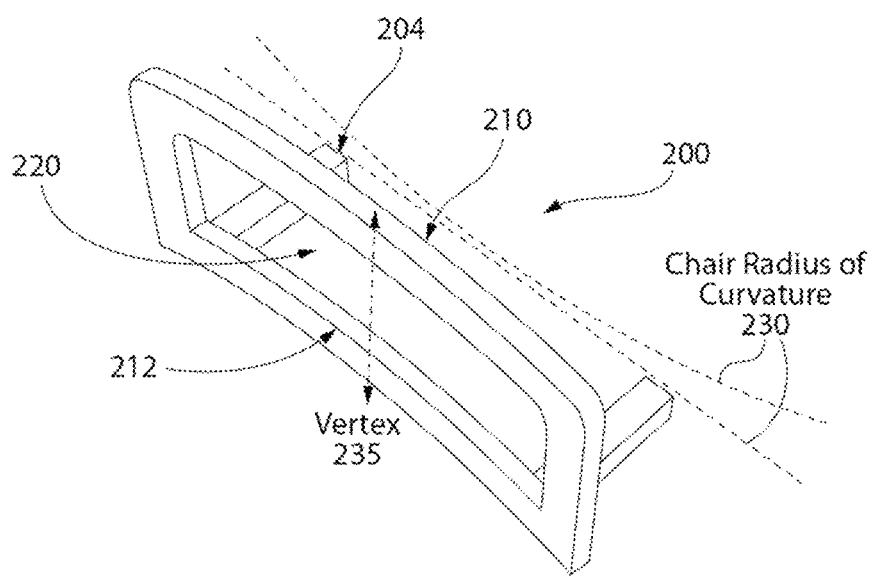

With reference now to FIGS. 2A and 2B, a chair 210 with integrated hanger is shown according to one embodiment. The chair 210 has a seating portion 212 connected to a back portion 214. Protruding from the back portion 214 is a hanger 200 integrated into the chair 210. Embodiments of the hanger 200 include a geometry and dimensions that facilitate safety. For example, with reference now to the hanger 200 shown isolated from the chair in FIGS. 3A and 3B, the separation between two chair connection points 202, 204 and a concave radius of curvature 210, 212 which can oppose a radius of curvature 230 of the chair back stabilize the walker when mounted while also allowing for easy access while mounting and dismounting. The opposing curvatures allow a snug fit for a variety of different walkers, while the chair radius of curvature is forgiving to allow a slight compression on the walker for stability. Specifically, a straight bracket will not allow a typical walker to hang without it tilting forward and hitting the chair since straight brackets might not necessarily fit the variable geometry of certain walkers. This interference between a straight bracket and variable walker geometry can cause the walker to rest against or bias against the chair, creating damage to the legs of the chair and possibly the walker. The angles and radius incorporated into the embodiments disclosed herein allow the walker to vary in size and shape but always hang straight vertically. The radius allows for center-point compression of the walker at the vertex of the radius for stability, all while the hanger structure gradually moves way from the walker (via the radius) away from the walker so that it does not interfere with the ability of the walker to hang straight down. The center-point compression of the walker at the vertex can be centered between the two connection points. Thus, the walker rests on the two connection points, held firmly in place at the vertex, minimizing the possibility of the walker damaging the chair legs since it hangs straight down and stable. An opening 220 can be included in the hanger 210 so that it also functions as a chair pull.

Figure 4A:
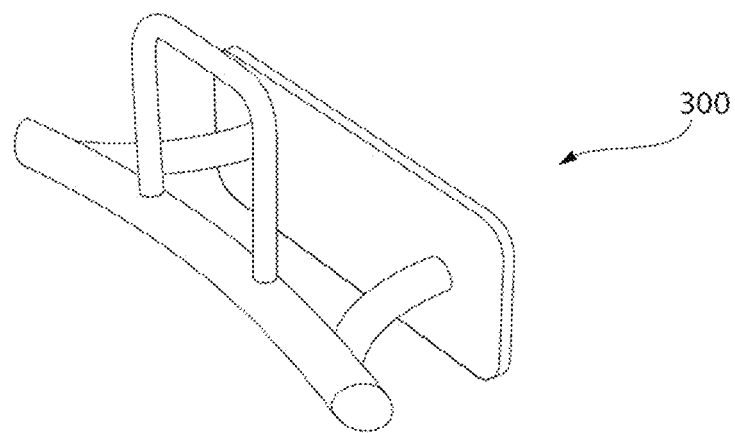
FIG. 4A is a perspective view of a hanger and FIG. 4B is an alternate perspective view according to one embodiment.
Figure 4B:
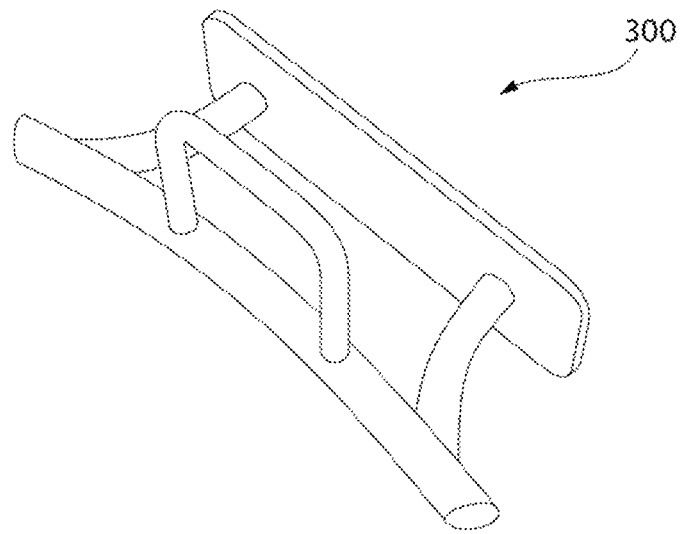
Figure 5A:
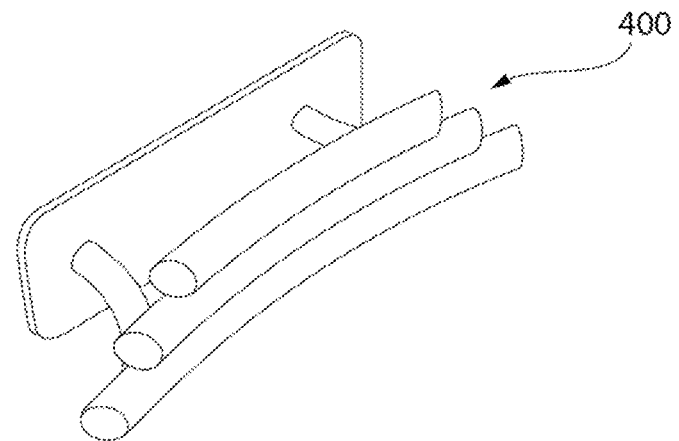
FIG. 5A is a perspective view of a hanger and FIGS. 5B and 5C are alternate perspective views according to one embodiment.
Figure 5B:
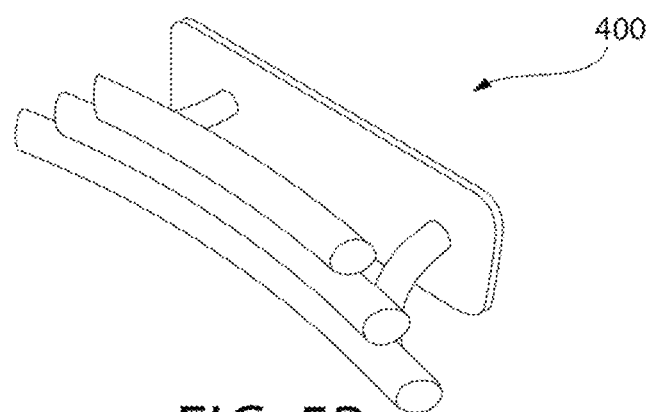
Figure 5C:
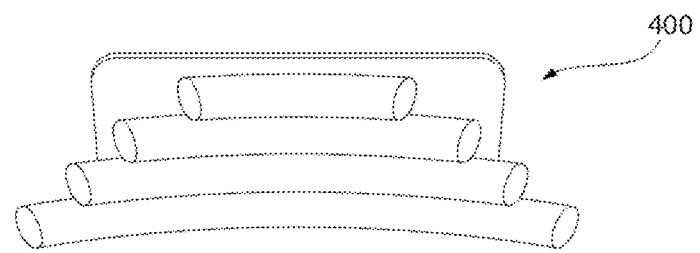

The hanger can be several different geometries without departing from novel features according to several different embodiments. For example, FIGS. 4A and 4B illustrate an embodiment 300 that has an alternate central opening and includes the radius of curvature for mounting the walker. Dimensions according to one exemplary embodiment require the hanger attached to the chair so that the hanger's height from the ground is within the range between 30 inches and 34 inches. Due to the way we the handle is engineered the walker sits fully upright and therefore does not create a tipping issue on a typical chair. Alternate embodiments are shown in the hanger 400 of FIGS. 5A-5C.

Embodiments of the hanger are fastened to the chair using techniques known in the art, such as by wood screws or with a machine screw and t-bolt combination. Various additional safety features can be implemented. In one embodiment, a spring loaded hinged bracket flips the bracket down if the walker is too heavy as a safety feature to avoid the chair becoming unstable. In one embodiment, the hanger flips out when needed then folds into a recess in the chair when not in use. In one embodiment, an ergonomic gripping portion is integrated above the hanger so that the bracket component can also be used as a grip for pulling the chair out while a walker is mounted on the hanger. In one embodiment, weighted front feet are implemented as a safety feature to counteract the hanging walker and increase stability. However, these features are not necessarily required since the chair will not tip with use for a walker. These embodiments may be more suitable for a heavy backpack or heavy purse, such as for chairs in a college campus cafeteria. The hanger can be manufactured from furniture grade materials known in the art such as woods and metals. It is also possible to 3D print the bracket using an ultra-strong material such as carbon fiber and other polymers.

Experimental Examples

The invention is now described with reference to the following Examples. These Examples are provided for the purpose of illustration only and the invention should in no way be construed as being limited to these Examples, but rather should be construed to encompass any and all variations which become evident as a result of the teaching provided herein.

Without further description, it is believed that one of ordinary skill in the art can, using the preceding description and the following illustrative examples, make and utilize the present invention and practice the claimed methods. The following working examples therefore, specifically point out the preferred embodiments of the present invention, and are not to be construed as limiting in any way the remainder of the disclosure.

Figure 6A:
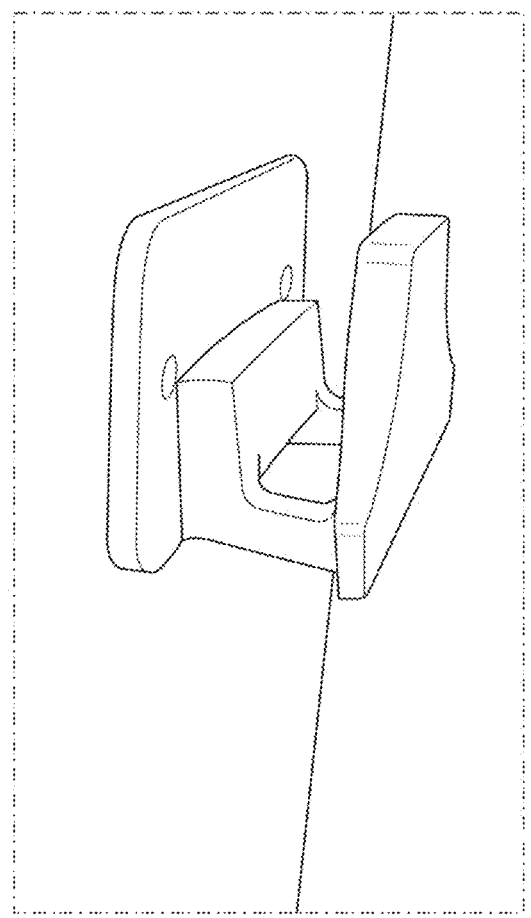
FIG. 6A is an image of a prototype of a hanger attached to an unfinished chair according to one embodiment.
Figure 6B:
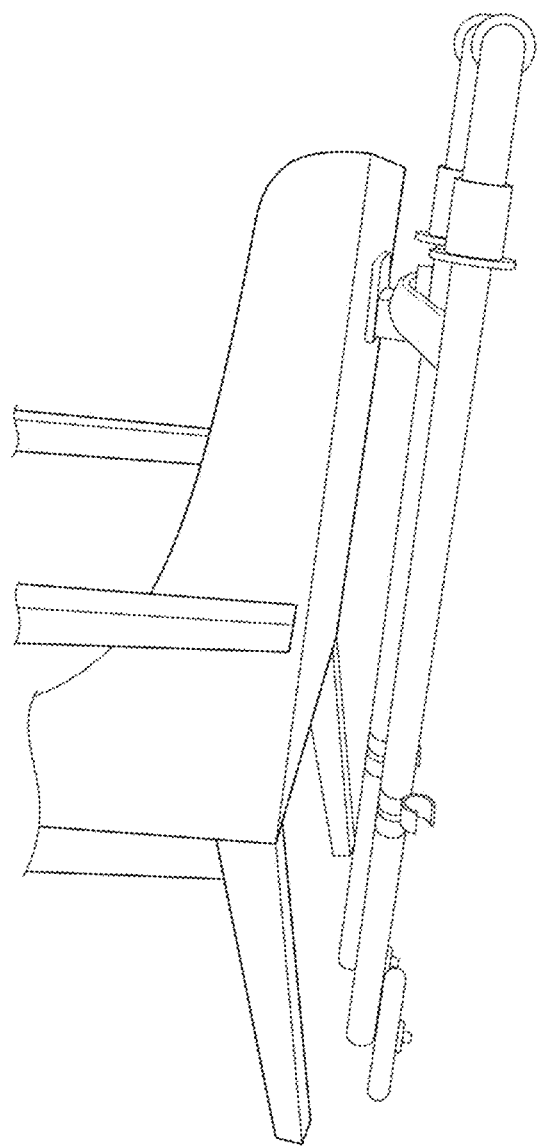
FIGS. 6B-6D are alternate views of the prototype hanger holding a folded walker.
Figure 6C:
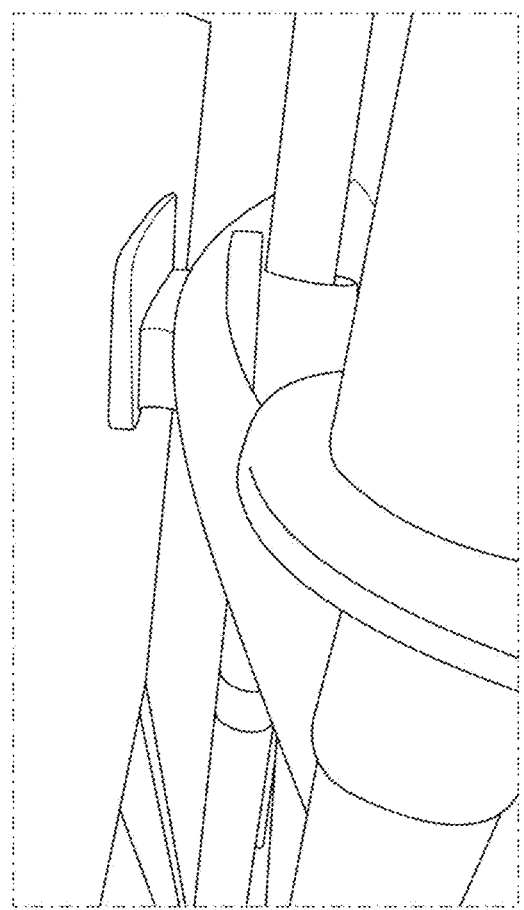
Figure 6D:
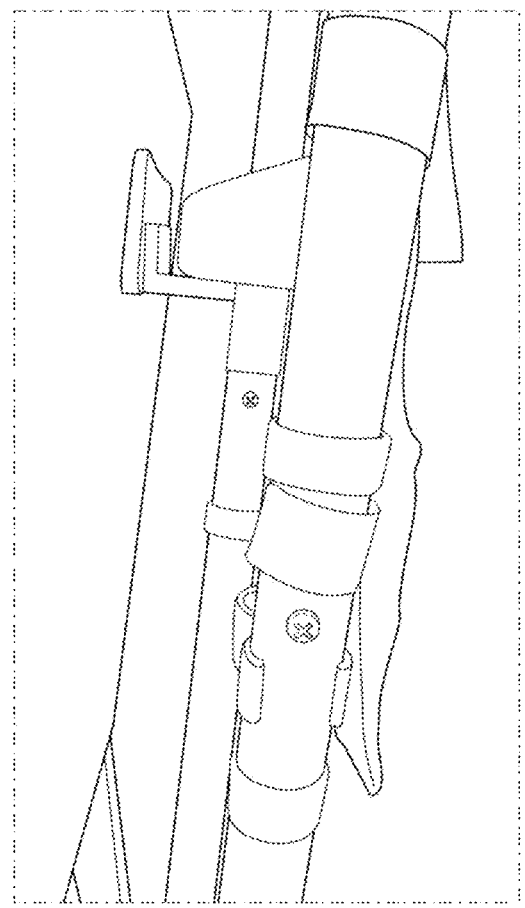

FIGS. 6A-6D show a prototype of the embodiment of FIGS. 1A-1D. FIG. 6A shows the prototype hanger attached to a pitched chair back, while FIGS. 6B-6D show a folded walker resting in the hanger. The hanger configuration allows the walker to fit securely into the hanger, substantially parallel to the back pitch of the chair and suspended from excess movement or sway.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention.

What is claimed is:

1. A chair comprising:
  a seating portion connected to a back portion; and
  a hanger connected to the back portion, the hanger comprising a front plate, a back plate opposing the front plate, and a plate separator defining a lower and an upper gap between the front plate and the back plate;
  wherein an interior surface of the front plate that at least partially defines the lower gap comprises a first concave radius of curvature opening away from the back plate and a sidewall portion angled towards the back plate; and
  wherein an interior surface of the plate separator that at least partially defines the lower gap comprises a second concave radius of curvature opening away from the back plate and a sidewall portion angled towards the back plate.

2. The chair of claim 1, wherein a gap between the first and second concave radius of curvature increases moving away from center.

3. The chair of claim 1, wherein the upper gap is larger than the lower gap.

4. The chair of claim 1, wherein the back plate is tapered inward.

5. The chair of claim 1, wherein the back plate comprises first and second connection elements, and a vertex of the first and second concave radius of curvature is positioned halfway between first and second connection elements.

6. The chair of claim 5, wherein the first and second connection elements are first and second fastener openings.

7. The chair of claim 1, wherein the back portion is angled at least partially backwards.

8. A chair hanger comprising:
  a front plate, a back plate opposing the front plate, and a plate separator defining a lower and an upper gap between the front plate and the back plate;
  wherein an interior surface of the front plate that at least partially defines the lower gap comprises a first concave radius of curvature opening away from the back plate and a sidewall portion angled towards the back plate; and
  wherein an interior surface of the plate separator that at least partially defines the lower gap comprises has a second concave radius of curvature opening away from the back plate and a sidewall portion angled towards the back plate.

9. The hanger of claim 8, wherein a gap between the first and second concave radius of curvature increases moving away from center.

10. The hanger of claim 8, wherein the upper gap is larger than the lower gap.

11. The hanger of claim 8, wherein the back plate is tapered inward.

12. The hanger of claim 8, wherein the back plate comprises first and second connection elements, and a vertex of the first and second concave radius of curvature is positioned halfway between first and second connection elements.

* * * * *